United States Patent
Zhou et al.

(10) Patent No.: US 8,150,116 B2
(45) Date of Patent: Apr. 3, 2012

(54) METHOD AND SYSTEM FOR DETECTION OF DEFORMABLE STRUCTURES IN MEDICAL IMAGES

(75) Inventors: Shaohua Kevin Zhou, Plainsboro, NJ (US); Feng Guo, Chicago, IL (US); Jin-hyeong Park, Princeton, NJ (US); Gustavo Henrique Monteiro de Barros Carneiro, Plainsboro, NJ (US); Constantine Simopoulos, San Francisco, CA (US); Joanne Otsuki, Oakland, CA (US); Dorin Comaniciu, Princeton Junction, NJ (US); John I. Jackson, Menlo Park, CA (US)

(73) Assignee: Siemens Corporation, Iselin, NJ (US)

( * ) Notice: Subject to any disclaimer, the term of this patent is extended or adjusted under 35 U.S.C. 154(b) by 959 days.

(21) Appl. No.: 12/214,339

(22) Filed: Jun. 18, 2008

(65) Prior Publication Data

US 2009/0010509 A1    Jan. 8, 2009

Related U.S. Application Data

(60) Provisional application No. 60/947,520, filed on Jul. 2, 2007.

(51) Int. Cl.
*G06K 17/00* (2006.01)
(52) U.S. Cl. ....................................................... 382/128
(58) Field of Classification Search .................. 128/922; 382/128, 131
See application file for complete search history.

(56) References Cited

U.S. PATENT DOCUMENTS

| | | | |
|---|---|---|---|
| 5,429,137 A | 7/1995 | Phelps et al. | |
| 6,346,124 B1 | 2/2002 | Geiser et al. | |
| 6,716,175 B2 | 4/2004 | Geiser et al. | |
| 2006/0008143 A1* | 1/2006 | Truyen et al. | 382/173 |
| 2006/0045347 A1 | 3/2006 | Xiao et al. | |
| 2006/0074312 A1 | 4/2006 | Georgescu et al. | |
| 2008/0069436 A1 | 3/2008 | Orderud | |
| 2009/0043213 A1* | 2/2009 | Kovacs et al. | 600/485 |

OTHER PUBLICATIONS

Park et al (Deformable Models with Parameter Functions, IEEE Transactions on Medical Imaging, vol. 15 No. 3, Jun. 1996).*
Felzenszwalb, P., "Representation and Detection of Deformable Shapes", IEEE Trans. PAMI, 2005.
Liu, L., et al., "Deformable Shape Detection and Description Via Model-Based Region Grouping", IEEE Trans. PAMI, 1999.

* cited by examiner

*Primary Examiner* — Clayton E Laballe
*Assistant Examiner* — Leon W Rhodes, Jr

(57) ABSTRACT

A method and system for detection of deformable structures in medical images is disclosed. Deformable structures can represent blood flow patterns in images such as Doppler echocardiograms. A probabilistic, hierarchical, and discriminant framework is used to detect such deformable structures. This framework integrates evidence from different primitive levels via a progressive detector hierarchy, including a series of discriminant classifiers. A target deformable structure is parameterized by a multi-dimensional parameter, and primitives or partial parameterizations of the parameter are determined. An input image is received, and a series of primitives are sequentially detected using the progressive detector hierarchy, in which each detector or classifier detects a corresponding primitive. The final detector detects configuration candidates for the deformable structure.

32 Claims, 7 Drawing Sheets

METHOD AND SYSTEM FOR DETECTION OF DEFORMABLE STRUCTURES IN MEDICAL IMAGES

This application claims the benefit of U.S. Provisional Application No. 60/947,520, filed Jul. 2, 2007, the disclosure of which is herein incorporated by reference.

BACKGROUND OF THE INVENTION

The present invention relates to detection of deformable structures in medical images, and more particularly, to detection of deformable structures in medical images using a probabilistic, hierarchical, and discriminant framework.

Rapid and accurate detection of deformable structures in medical images is a difficult task. Deformable structures in medical images are anatomic structures with non-rigid boundaries. Since deformable anatomic structures are non-rigid, it is necessary to explore a high dimensional configuration space to detect the shape of deformable structures. Furthermore, the anatomy appearance variation is large in deformable structures, such that the shape of a deformable structure from one patient cannot be rigidly transformed to determine the shape of the deformable structure in another patient. This results in a complex appearance model for deformable structures. Additionally, speed and accuracy requirements for the detection of deformable structures in medical images pose additional challenges.

The use of generative models and energy minimization methods to detect deformable structures is widely studied. Classic deformable models seek a parameterized curve that minimizes a cost function based on a gradient operator, assuming that the edge defines the curve. In P. Feizenszwalb et al., "Representation and Detection of Deformable Shapes", *IEEE Trans. PAMI*, 27, 2005, a deformable shape is represented using triangulated polygons, which are fitted to the shape using energy minimization. In S. Sclaroff et al., "Deformable Shape Detection and Description via Model-Based Region Grouping", *IEEE Trans. PAMI*, 23:475, model-based region grouping is used to find a deformable template, while in J. Coughlan et al., "Finding Deformable Shapes Using Loopy Belief Propagation", In *European Conf. Computer Vision,* 2002, loopy belief propagation is used. Disadvantages of using the above generative models to detect deformable structures include their need for initialization and slow fitting speeds.

BRIEF SUMMARY OF THE INVENTION

The present invention addresses detection of deformable structures in medical images. Embodiments of the present invention provide a probabilistic, hierarchical, and discriminant (PHD) framework for classifier based detection of deformable anatomic structures in medical images. The PHD framework probabilistically integrates distinctive primitives of the anatomic structures at global, segmental, and landmark levels. Because the configuration of the anatomic structures lies in a high-dimensional parameter space, the PHD framework seeks the best configuration via hierarchical evaluation of the detection probability that quickly prunes the search space. To separate the primitives from the background, the PHD framework is implemented by discriminative boosting learning.

In one embodiment of the present invention, the configuration for a deformable structure that is parameterized by a multi-dimensional parameter is detected in an input image. The input image is received, and a series of primitives are sequentially detected using a hierarchal set of primitive detectors, each of which detects a corresponding primitive. The primitives are partial parameterizations of the multi-dimensional parameter. The final detector detects configuration candidates for the entire multi-dimensional parameter. The configuration of the deformable structure is determined based on the configuration candidates detected by the final detector.

In another embodiment of the present invention, a target deformable structure is parameterized by a multi-dimensional parameter. A set of primitives, which are partial parameterizations of the multi-dimensional parameter are then determined for the target deformable structure. A hierarchical set of primitive detectors are then trained based on training samples. Each of the primitive detectors detects a corresponding primitive. Each of the primitive detectors can be trained as a probabilistic boosting tree (PBT) or other binary classifier.

These and other advantages of the invention will be apparent to those of ordinary skill in the art by reference to the following detailed description and the accompanying drawings.

DETAILED DESCRIPTION

The present invention is related to detection of deformable structures in medical images. Embodiments of the present invention are described herein to give a visual understanding of the deformable structure detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1A:
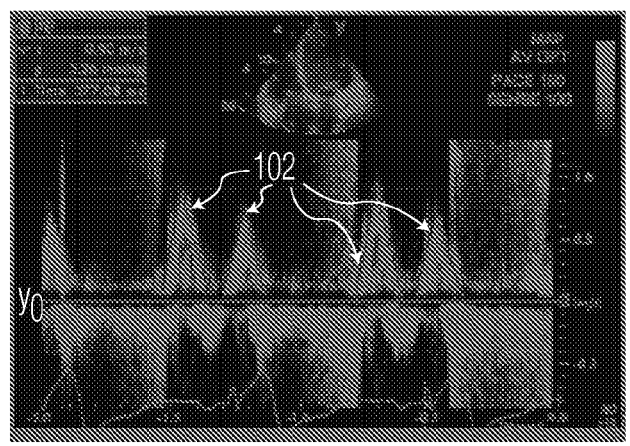
FIG. 1 illustrates exemplary Doppler echocardiograms.
Figure 1B:
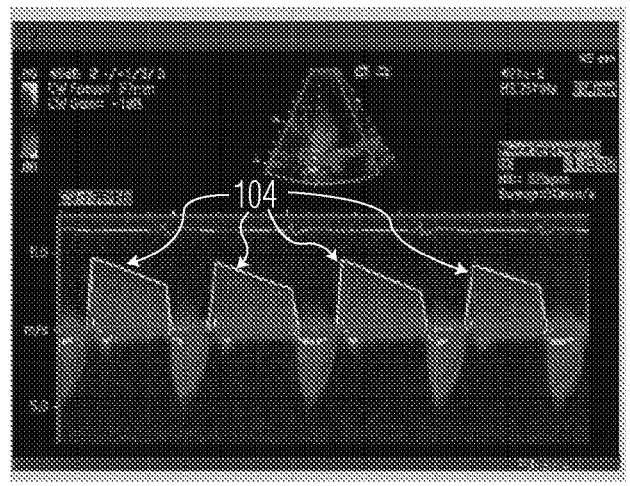
Figure 1C:
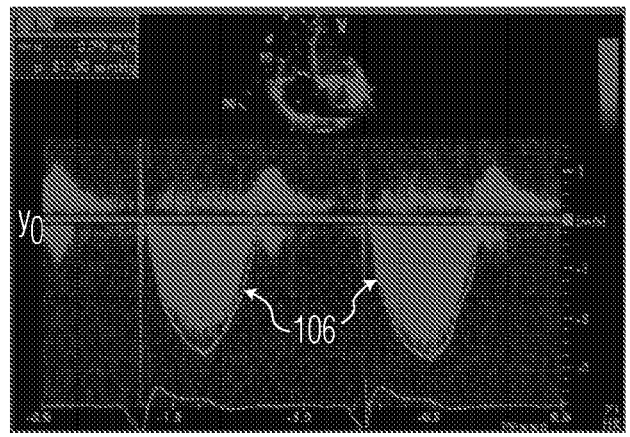

Embodiments of the present invention described herein are directed to detection of various deformable structures in Doppler echocardiograms, but the present invention is not limited thereto. Doppler echocardiography, which is widely used to assess cardiovascular functionalities such as valvular regurgitation and stenosis, employs the Doppler effect to determine whether structures (e.g., blood) are moving towards or away from an ultrasound probe, and the relative velocity of the structures. The resulting Doppler echocardiogram is a velocity-time image. FIG. 1 illustrates exemplary Doppler echocardiograms. As illustrated in FIG. 1, image (a) is a Doppler echocardiogram showing mitral inflow, image (b) is a Doppler echocardiogram showing aortic regurgitation, and image (c) is a Doppler echocardiogram showing tricuspid regurgitation. The shape of the deformable structures varies for the mitral inflow, aortic regurgitation, and tricuspid regurgitation images. As illustrated in image (a), triangles 102 are detected in the mitral inflow image. As illustrated in image (b), quadrilaterals 104 are detected in the aortic regurgitation image. As illustrated in image (c), curves 106 are detected in the tricuspid regurgitation image. The baseline position $y_0$ in each Doppler echocardiogram image is given a priori.

The deformable structures can be parameterized by multi-dimensional parameters. Parameterizations of the deformable structures in the mitral inflow image, aortic regurgitation image, and tricuspid regurgitation image are expressed below in (1), (2), and (3), respectively:

$$\theta_a = (x_{LR}, y_0, x_{PK}, y_{PK}, x_{RR}, y_0), \quad (1)$$

$$\theta_b = (x_{LR}, y_0, x_{LP}, y_{LP}, x_{RP}, y_{RP}, x_{RR}, y_0), \quad (2)$$

$$\theta_c = (x_{LR}, y_0, x_{PK}, y_{PK}, x_{RR}, y_0, \alpha_1, \ldots, \alpha_n). \quad (3)$$

In (1), the triangle in the mitral inflow image is parameterized by three points of left root (LR), right root (RR), and peak (PK). The LR and RR are the vertices of the triangle located on the baseline $y_0$, and the peak is the peak of the triangle. Since the baseline $y_0$ is fixed, this parameterization includes four variables. In (2), the quadrilateral in the aortic regurgitation image is parameterized by four points of left root (LR), right root (RR), left peak (LP) and right peak (RP), with six variables. In (3), the curve in the tricuspid regurgitation image is parameterized by first aligning three points (LR, RR, PK) and then using n principal component analysis (PCA) coefficients $\alpha$ to model the curve variation. In an advantageous implementation, n=3, leading to a 7-D parameterization.

In order to formulate deformable structure detection as a classification problem, given an image I, the goal is to determine the best configuration $\hat{\theta}$ (or several isolated configurations) that maximizes (or locally maximizes) the detection probability $p(O|I,\theta) = p(O|I(\theta))$, i.e., $$\hat{\theta} = arg_\theta \max p(O|I, \theta), \quad (4)$$

where $I(\theta)$ is a warped patch extracted from image I using the parameter $\theta$. However, due to non-rigid deformation, the warping computation may become a bottleneck. If a global detector trained based on non-rigidly warped images is used, during testing of a Doppler echocardiogram line there are typically over millions of warping possibilities. Accordingly, performing all of the possible warping operations is impractical for rapid detection of deformable structures.

Embodiments of the present invention utilize a probabilistic, hierarchical, and discriminant (PHD) framework for classifier-based detection of deformable structures. The PHD framework probabilistically integrates distinctive primitives of the deformable structures at global, segmental, and landmark levels to give an accurate account of the target structure. Because the configuration of the deformable structures lies in a high-dimensional parameter space, the PHD framework seeks the best configuration via the hierarchical evaluation of the detection probability that quickly prunes the search space. The hierarchy of the PHD framework is built in a simple to complex fashion. In order to separate the primitives from the background, the PHD framework is implemented by discriminative boosting learning.

As described above, The PHD framework probabilistically integrates distinctive primitives of the deformable structures at global, segmental, and landmark levels. Let P denote the appearance for a primitive derived from the image. The primitive can be a landmark L, a local segment or "part" R, or a perfectly warped global template T. As used herein, segment or "part" refers to some intermediate representation between the landmark and the global template. In other words, the segment or "part" R uses a partial parameterization of the overall parameter $\theta$. The global template is the final configuration of the parameter $\theta$. Given an image I, and primitives $P_i$; i=1, ..., $N_P$ associated with the image I, the PHD framework, assuming the conditional independence among the primitives, aims to determine the best configuration $\hat{\theta}$ that maximizes the detection probability $p(O|I,\theta)$ defined as the product of the primitive detection probabilities:

$$p(O|I, \theta) = \prod_{i=1}^{N_P} p(O|P_i, \theta^{P,i}), \quad (5)$$

where $N_P$ is the number of primitives. Equivalently, $$p(O|I, \theta) = \prod_{i=1}^{N_L} p(O|L_i, \theta^{L,i}) \prod_{i=1}^{N_R} p(O|R_i, \theta^{R,i}) p(O|T, \theta). \quad (6)$$

where $N_L$ and $N_R$ are the numbers of landmarks and segments, respectively, and $N_P = N_L + N_R + 1$. Note that there is only one perfectly aligned global template.

To detect deformable structures in Doppler echocardiograms, it is possible to train 2-3 landmark detectors (e.g., two root detectors and/or one peak detector), one segment or "part" detector, and one global detector to detect the warped image $T(\theta)$. The segment or "part" detector can be a box detector that finds a bounding box containing the Doppler structure. For example, in the Doppler aortic regurgitation case, the parameter $\theta^R$ associated with the box is $\theta^R = (x_{LR}, y_0, y_{LP}, x_{RR}, y_0)$. Note that this is a partial parameterization of the parameter $\theta_b$ given in (2) above.

Using the product rule given in expression (7) below allows an efficient exploration of the parameter space. If any term in the product is zero (or close to zero), then the overall detection probability is zero (or close to zero). This implies that if one of the classifiers fails to recognize the input as positive for a configuration candidate, that configuration candidate can be discarded without evaluation by the remaining candidates. The product rule is given by:

$$\arg\max_\theta p(O|I, \theta) = \prod_{i=1}^{N_P} p(O|P_i, \theta^{P,i}) \quad (7)$$

$$\text{subject to } p(O|P_i, \theta^{P,i}) > \varepsilon_i$$

where each $\varepsilon_i$ is a pre-specified threshold close to zero. Each classifier defines a "feasible" region in which the parameter lies. The overall "feasible" region is the intersection of the "feasible" regions of all of the classifiers. The PHD framework seeks the maximizing parameter configuration in the overall "feasible" region. Accordingly, the search space can be pruned by using a progressive detector (classifier) hierarchy.

Figure 2:
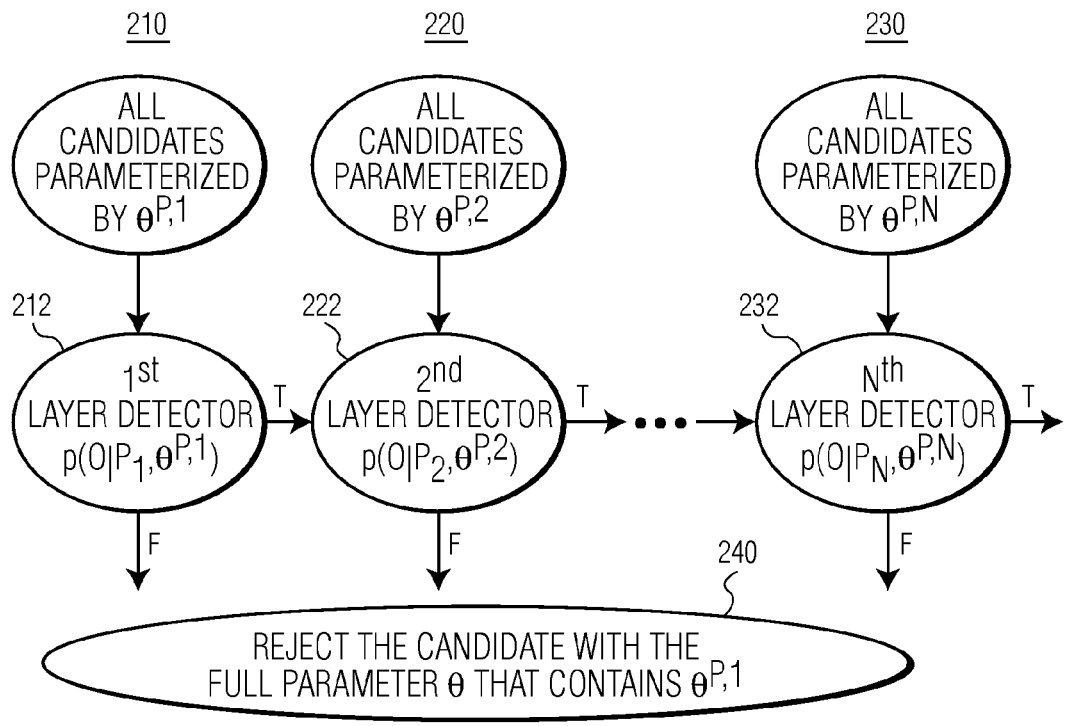
FIG. 2 illustrates a progressive detector hierarchy according to an embodiment of the present invention.

FIG. 2 illustrates a progressive detector hierarchy according to an embodiment of the present invention. As illustrated in FIG. 2, the progressive detector hierarchy includes multiple layers 210, 220, and 230 of detectors. Each layer 210, 220, and 230 detects a particular primitive of a deformable structure in order to prune the relevant space to find the "feasible" region. At the first layer 210, the possible candidates for the configuration of the deformable structure are parameterized by the first layer primitive $\theta^{P,1}$, which is a partial parameterization of the overall parameter $\theta$. The first layer detector 212 classifies candidates as positive or negative based a detection probability $p(O|P_1,\theta^{P,1})$ of the first layer primitive. The candidates classified as positive (T) are then passed to the second layer 220. In the second layer 220, the possible candidates are parameterized by a second layer primitive $\theta^{P,1}$, which is another partial parameterization of the overall parameter $\theta$. The second layer detector 222 classifies the candidates as positive or negative based a detection probability $p(O|P_2,\theta^{P,2})$ of the second layer primitive. The candidates classified as positive then move on the next layer. This is repeated through an $N^{th}$ layer 230, in which an $N^{th}$ layer detector 232 classifies the remaining candidates based on an $N^{th}$ layer primitive $\theta^{P,N}$. The $N^{th}$ layer primitive is the global template of the deformable structure, or the overall parameter $\theta$. That is, $\theta^{P,N}=\theta$. At each of the layers 210, 220, and 230 of the progressive detector hierarchy, the candidates classified as negative (F) by the detector are rejected and are not further considered by subsequent layers (240). Accordingly, the full parameter $\theta$ that contains the rejected primitive $\theta^{P,i}$ is rejected. This prunes the search space so that each subsequent layer has less configuration candidates.

Figure 3:
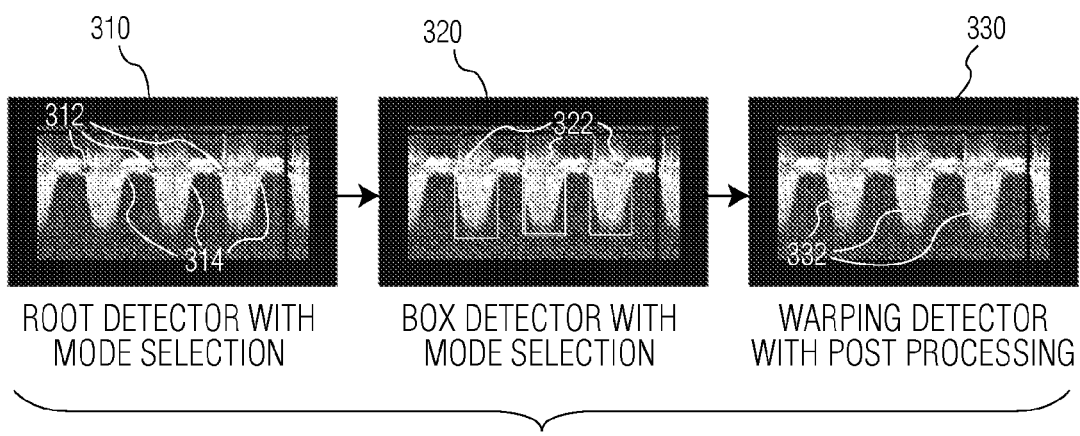
FIG. 3 illustrates the detection of curves in a tricuspid regurgitation Doppler echocardiogram using the progressive detector hierarchy of FIG. 2.

FIG. 3 illustrates the detection of curves in a tricuspid regurgitation Doppler echocardiogram using the progressive detector hierarchy of FIG. 2. As illustrated in FIG. 3, images 310, 320, and 330 show three layers used to detect the curves in a tricuspid regurgitation Doppler echocardiogram. As illustrated in image 310, the first layer (landmark layer) detects the left root 312 and right root 314 using a root detector with mode selection. Mode selection is described in detail below. Accordingly, the first layer detects the primitives $x_{LR}$ and $x_{RR}$ of the parameter $\theta$ expressed in (3) above. As illustrated in image 320, the second layer (segment layer) detects a bounding box 322 using a box detector with mode selection. Accordingly, the second layer detects the primitive $(x_{LR},y_{PK},x_{RR})$ of the parameter $\theta$ expressed in (3) above. As illustrated in image 330, the third layer (global template layer) detects curves 332 using a warping detector with post processing. The third layer detects the full parameter $\theta$, as expressed in (3) above.

Embodiments of the present invention adopt the principle of using simple models first, followed by complex models, when designing the progressive detector hierarchy. There are two types of complexity, model complexity and computational complexity. The model complexity of a binary classifier is determined by the shape of the decision boundary. The computational complexity depends on both the model complexity and the scanning procedure. For example, a left/right root detector is simple to train and needs only a line scan (along the baseline), whereas a warping detector is difficult to train, rendering a complex model, and it takes longer to search. In order to build a detector hierarchy that supports fast evaluation, the PHD framework starts with simple models and progressively moves to more complex models in terms of computation. Examples, of the progressive detector hierarchy for detecting deformable structures in mitral inflow, aortic regurgitation, and tricuspid regurgitation Doppler echocardiograms are shown in Table 1. Table 1 lists the primitive detectors used at each layer of the progressive detector hierarchy for each case, as well as the number of weak classifiers used for each primitive detector.

TABLE 1

The list of primitive detectors in the progressive detector hierarchy.

| structure | Mitral inflow triangle | Aortic reg. quadrilateral | Tricuspid reg. curve |
|---|---|---|---|
| 1st layer det. | box | left root & right root | left root & right root |
| parameter | $(x_{LR}, y_{PK}, x_{RR})$ | $(x_{LR})$ & $(x_{RR})$ | $(x_{LR})$ & $(x_{RR})$ |
| # of WCs | 299 | 61 & 92 | 243 & 274 |
| 2nd layer det. | peak | box | box |
| parameter | $(x_{PK}, y_{PK})$ | $(x_{LR}, y_{LP}, x_{RR})$ | $(x_{LR}, y_{PK}, x_{RR})$ |
| # of WCs | 103 | 192 | 739 |
| 3rd layer det. | NA | left peak | warping |
| parameter | — | $(x_{LP}, y_{LP})$ | $(x_{LR}, x_{PK}, y_{PK}, x_{RR}, \alpha_1, \alpha_2, \alpha_3)$ |
| # of WCs | — | 54 | 550 |
| 4th layer det. | NA | warping | NA |
| parameter | — | $(x_{LR}, x_{LP}, y_{LP}, x_{RP}, y_{RP}, x_{RR})$ | — |
| # of WCs | — | 316 | — |

As shown in Table 1, triangles can be detected in mitral inflow Doppler echocardiograms by detecting a primitive of a bounding box in a first layer and detecting the peak of the triangle in a second layer to determine a configuration of the full parameter for the triangle. Quadrilaterals can be detected in aortic regurgitation Doppler echocardiograms by detecting primitives of the left root and the right root in a first layer, a bounding box in a second layer, the left peak in a third layer, and a warped global template for the quadrilateral in a fourth layer. Curves can be detected in tricuspid regurgitation by detecting primitives of the left root and the right root in a first layer, a bounding box in a second layer, and a warped global template for the curve in a third layer.

Each detector in the progressive detector hierarchy is a binary object detector trained as a probabilistic boosting tree (PBT). The PBT trains a binary decision tree, with each node of the tree being a strong classifier that combines multiple weak classifiers via a discriminant boosting method. Since the weak classifiers can be based on Haar-like local rectangle features whose rapid evaluation is enabled by an integral image, the PBT operates as a feature selector. The PBT also has early exits for fast negative rejection. The PBT also allows exact computation of the posterior probability of a candidate being positive.

In order to train detectors in all layers of the progressive detector hierarchy as PBTs, positive and negative training samples must be generated. Positive training samples can be generated using ground truth annotation (with a slight perturbation). When generating negative training samples, the interaction between layers of the progressive detector hierarchy is taken into account, especially for later layers of the hierarchy. For example, when generating negatives for the second layer box detector for quadrilateral detection in aortic regurgitation Doppler echocardiograms, only candidates with positive values for $x_{LR}$ and $x_{RR}$ that pass the first layer roots detectors are used. In this example, the values for the $y_{LP}$ variable for the negative training samples can be generated using values a few pixels away from the ground truth position.

Figure 4:
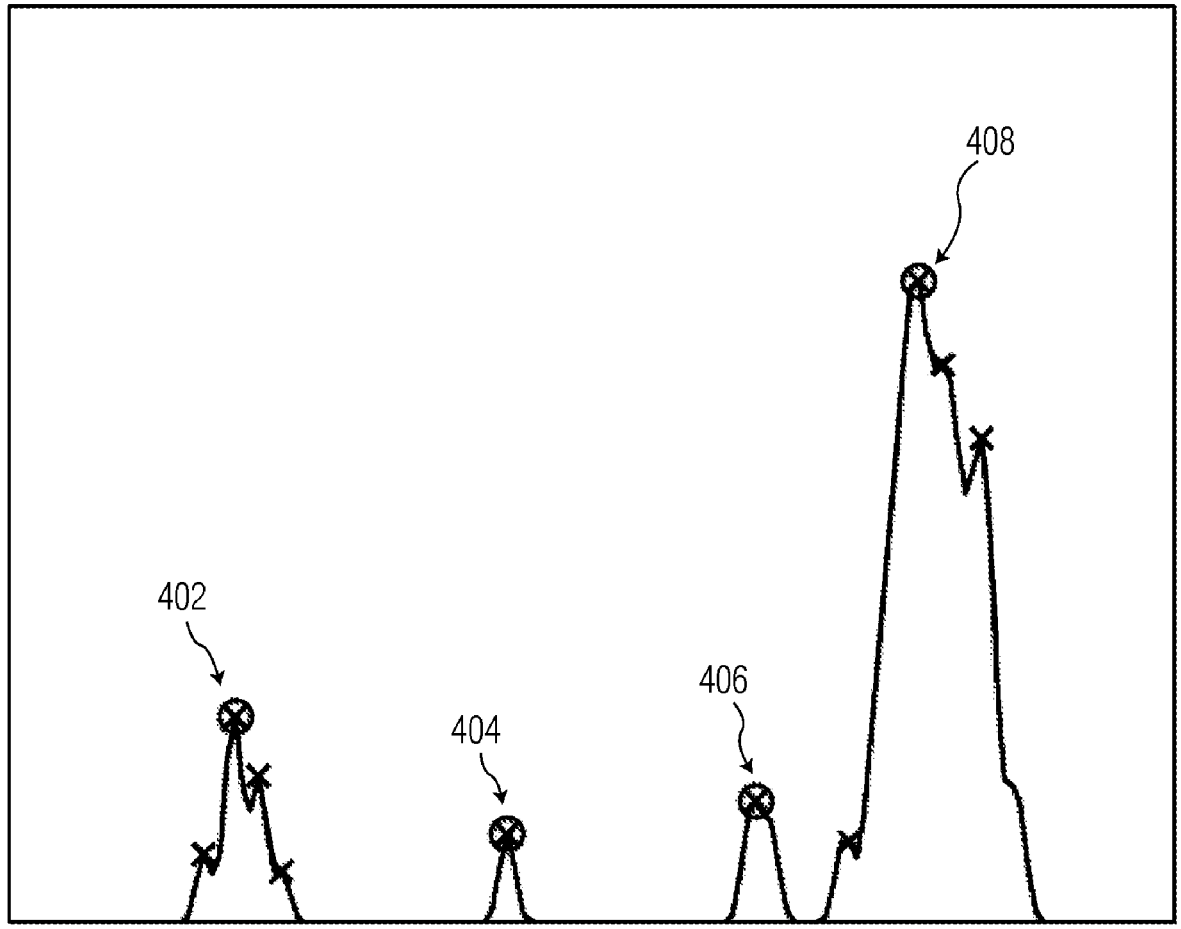
FIG. 4 illustrates mode selection based on an exemplary probability response map.

Mode selection can be performed for the results of each detector layer of the progressive detector hierarchy. The candidates close to the ground truth position (or highly confusing spots) are likely to fire up due to smoothness, which renders a large number of candidates that are selected as positive. Mode selection can be performed to further reduce to the search space by finding the isolated local maxima. Such a mode selection method is described herein using a 1-D example. It is to be understood the 1-D example is exemplary and a similar strategy can be applied for a multi-dimensional case. Given a probability response line, the probability response line is first smoothed to find all local maxima. The local maxima are ranked based on their responses, and then the following operations are performed to find isolated modes. Let the ordered set of local maxima be $\{y_1, y_2, \ldots, y_M\}$, L the final list of selected modes initialized as $L=y_1$, and $\lambda$ a pre-specified threshold. For $m=2, \ldots, M$, if the minimum distance $\min_{x \in L}(y_n, x) \geq \lambda$, then the local maximum $y_m$ is added to $L:L \cup \{y_m\}$. FIG. 4 illustrates mode selection based on an exemplary probability response map. As illustrated in FIG. 4, local maxima 402, 404, 406, and 408 are selected as isolated modes of the probability response map.

Figure 5A:
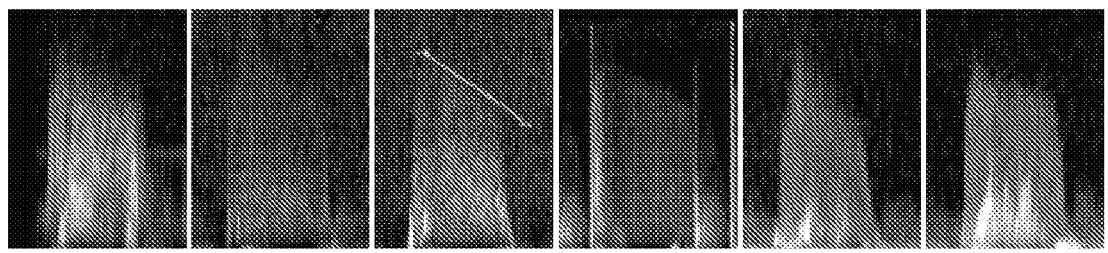
FIGS. 5A and 5B illustrate exemplary training samples generated by 2D warping of Doppler echocardiogram images.
Figure 5B:
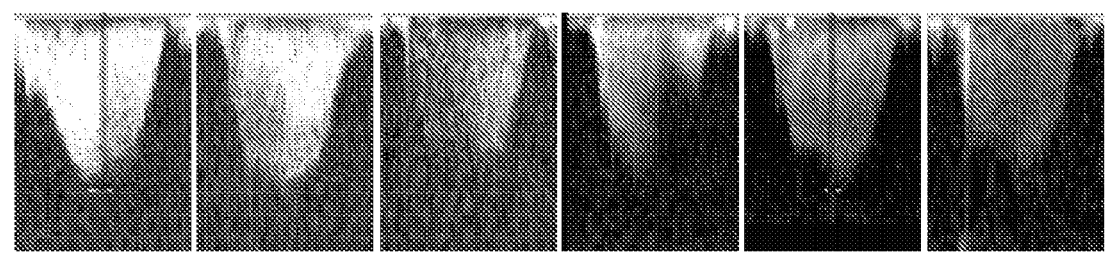

As described above, the final layer of the progressive detector hierarchy can be implemented as an image warping detector to warped image candidates for the global template of a deformable structure. In order to generate training samples to train a warping detector, it is important to align the global image appearance to place landmarks in the canonical positions. It is possible to generate training samples by warping images with respect to a common shape. For example, piecewise local rectangle warping can be used for 2-D image warping. It is also possible to use other techniques for image warping, such as thin plate spline (TPS) warping. FIGS. 5A and 5B illustrate exemplary training samples generated by 2D warping of Doppler echocardiogram images. FIG. 5A illustrates training examples generated by 2D warping aortic regurgitation Doppler echocardiogram images, and FIG. 5B illustrates training examples generated by 2D warping of tricuspid regurgitation Doppler echocardiogram images.

Figure 6A:
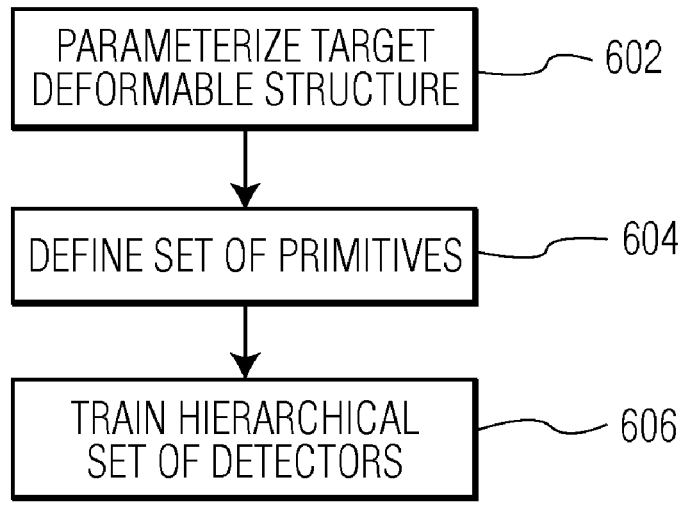
FIG. 6 illustrates a method for detecting deformable structures in medical images according to an embodiment of the present invention.

FIG. 6A illustrates a method for training deformable structure detectors according to an embodiment of the present invention. At step 602, a target deformable structure is parameterized. In this step a parameter is determined that defines the appearance of the deformable structure. For example, expressions (1), (2), and (3) above define parameters for triangles in mitral inflow Doppler echocardiograms, quadrilaterals in aortic regurgitation Doppler echocardiograms, and curves in tricuspid regurgitation Doppler echocardiograms, respectively. At step 604, a set of primitives is defined for the parameter of the target deformable structure. As described above, the primitives can include landmarks, segments or "parts", and a global template. The primitives are partial parameterizations of the full parameter of the target deformable structure.

At step 606, a hierarchical set of detectors are trained, each detector for detecting a corresponding primitive of the target deformable structure. The hierarchy of detectors is arranged in detector layers from simple to complex. For example, the detector hierarchy can include a layer of at least one landmark detector, a layer of at least one segment or "part" detector, and a global template detector. Table 1 above shows primitives and detector layers of the detector hierarchy for mitral inflow, aortic regurgitation, and tricuspid regurgitation Doppler echocardiograms. As described above, the detectors can be trained as PBTs, and in order to train the detectors training samples can be generated. For each layer, negative training samples are generated that are positive candidates for the preceding layer. Training samples for the global detector can be generated using 2D image warping.

Figure 6B:
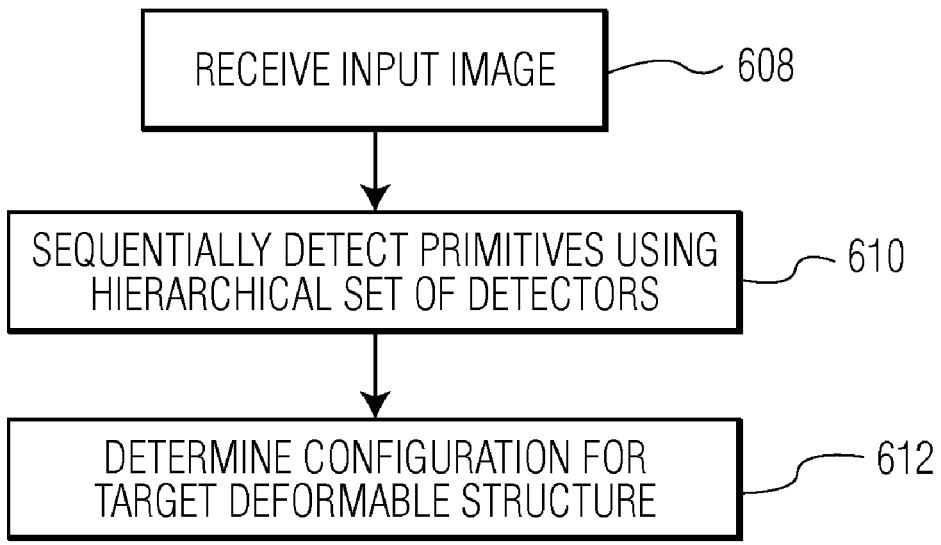

FIG. 6B illustrates a method for detecting deformable structures in medical images according to an embodiment of the present invention. At step 608, an input image is received. The input image can be an image received from a medical scanning device, such as an ultrasound device. For example, the input image can be a Doppler echocardiogram. At step 610, the primitives of the target deformable structure are sequentially detected by the hierarchical set of detectors. As described above, candidates that are classified as negative by any of the hierarchical set of detectors are discarded such the candidates are pruned by each layer of detectors. It is possible that each layer of detectors using mode selection in order to determine isolated modes to further prune the candidates. At step 612, the configuration of the target deformable structure is determined based on the detection results of the final detector in the hierarchical set of detectors. As described above, the final detector is a global detector that detects candidates for the full parameter defining the deformable structure. The final detector classifies configuration candidates for the full parameter as positive or negative based on the posterior probability for the candidates. In the end, the candidate having the highest posterior probability defined as the product of posterior probabilities of all of the hierarchical set of detectors is selected as output.

Figure 7:
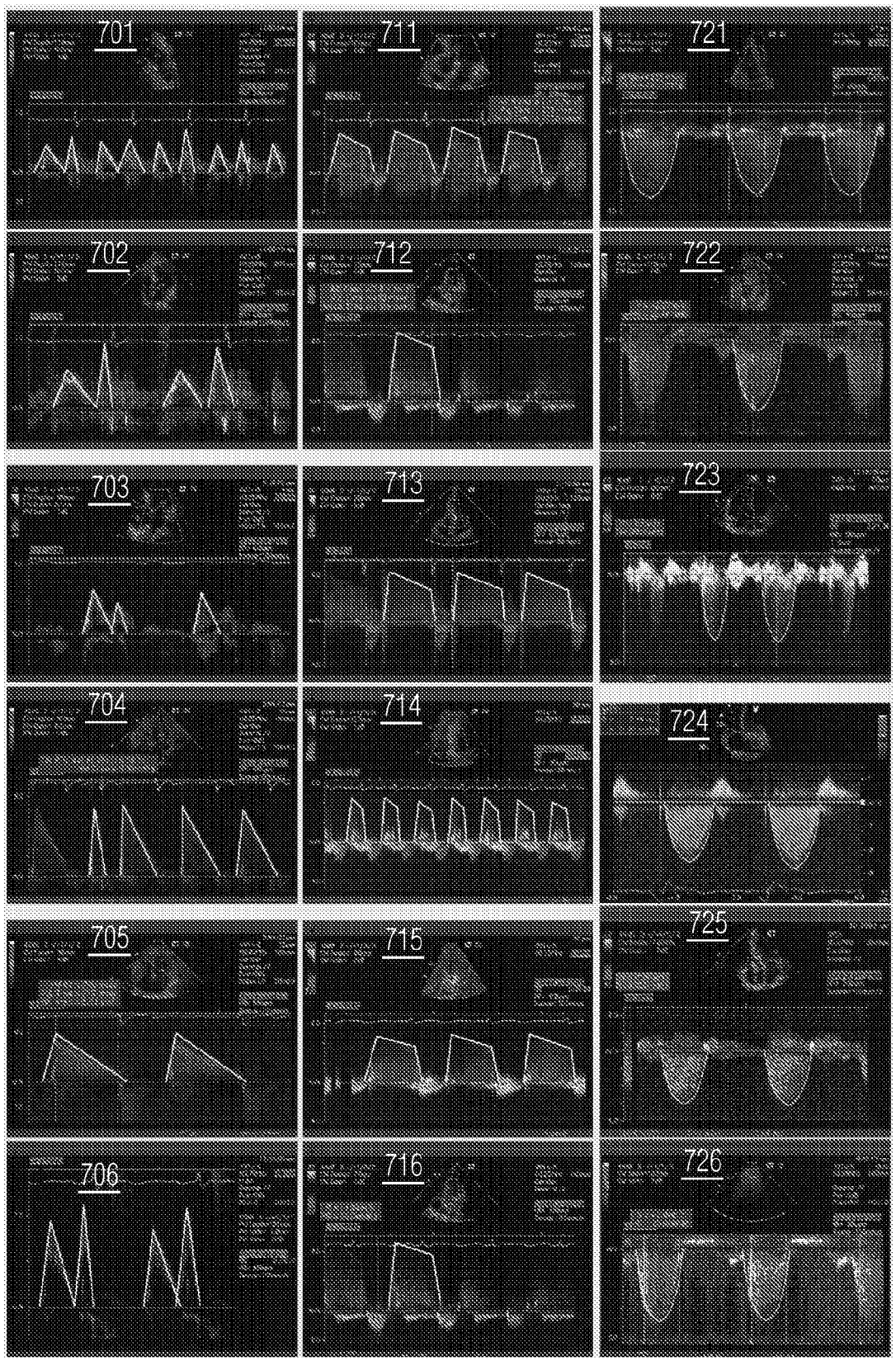
FIG. 7 illustrates exemplary deformable structure detection results in Doppler echocardiogram images.

FIG. 7 illustrates exemplary deformable structure detection results in Doppler echocardiogram images. The goal of detecting the deformable structures in Doppler echocardiograms is to derive automated measurements of Doppler spectra of the blood flow in the heart. FIG. 7 illustrates detecting of deformable structures for three types of flow: mitral inflow, aortic regurgitation, and tricuspid regurgitation using the methods of FIGS. 6A and 6B. However, the same framework can be applied to detecting deformable structures associated with other types of flows, such as tricuspid inflow, mitral outflow, pulmonic regurgitation, etc. As illustrated in FIG. 7, images 701-706 show triangles detected in exemplary mitral inflow Doppler echocardiograms, images 711-716 show quadrilaterals detected in exemplary aortic regurgitation Doppler echocardiograms, and images 721-726 show exemplary curves detected in tricuspid regurgitation images.

The inflow patterns through the mitral and tricuspid valves are similar, consisting of E and A waves. A trace of the envelope is required as well as identification of the peaks and the trough of the structure. For the mitral inflow case, it is sufficient to represent the E/A wave using a triangle. The regurgitation jets from aortic and pulmonary valves have a similar appearance. These measurements do not use the full trace, but only a fit to a straight line of the sloping part of the spectrum. Nevertheless, the quadrilateral is detected in the aortic regurgitation case. The regurgitation jets from the mitral and tricuspid jets have appearance from aortic and pulmonary valves. The trace of these regurgitation jets is complicated when portions of the jet are not visible, which is quite common. Accordingly, curves are detected in the tricuspid regurgitation case.

In order to generate the exemplary results, 153 mitral inflow, 43 aortic regurgitation, and 147 tricuspid regurgitation images were collected for training, and 46 mitral inflow, 6 aortic regurgitation, and 28 tricuspid regurgitation images were collected for testing. As illustrated in FIG. 7, the number of Doppler structure varies from image to image. For example, there may be approximately two to 20 triangles per mitral inflow image, one to seven quadrilaterals per aortic regurgitation image, and three to five curves per tricuspid regurgitation image.

Size normalization was performed only along the x-direction to compensate for discrepancies in the heart rate and the temporal sampling rate. After normalization, the images were padded (50 pixels in each direction) and the ECG signal line was removed.

The list of primitive detectors used to detect the deformable structures, along with their number of weak classifiers, is given in Table 1 above. The root detector is the simplest, while the warping detector is the most complicated. When designing the hierarchy of detectors, a main concern is the computation. Landmark/root scanning is both reliable (except in the mitral inflow case) and fast, so it can be used as the first layer. Since the warping is the most time consuming part, it is performed in the last layer, when used. In addition, the examples of FIG. 7 were detected using mode selection to further speed up the computation. In order to further reduce the number of warping candidates in testing, it is possible to store a code book of all possible warping possibilities (using the relative parameterization with respect to the bounding box) in the memory. It is also possible to add slight perturbations of parameter values to increase robustness. For example, in the aortic regurgitation case, 460 prior warping parameters were stored, even though there are only 93 structures. This way, a full-range search of the parameter used for time warping can be avoided.

The detection method of FIG. 6B is likely to have a cluster of overlapping detection results close to the ground truth. Among the cluster, the detection result having the maximum detection probability is selected as the output configuration of the deformable structure. Even after cluster removal, it is still possible to have severely overlapping results. If this occurs, the result with the maximum peak velocity can be selected as the final result.

Figure 8:
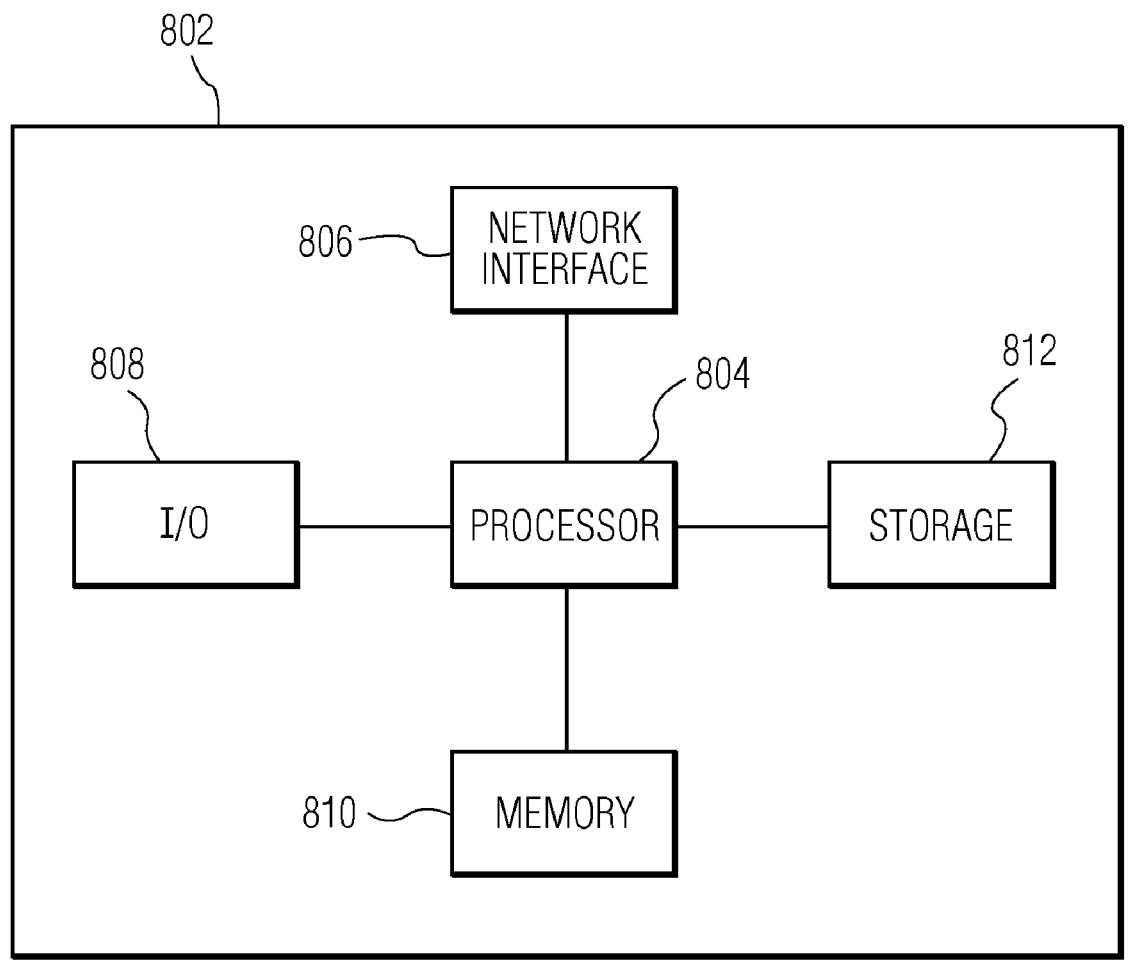
FIG. 8 is a high level block diagram of a computer capable of implementing the present invention.

The above-described methods for training detectors and detection of deformable structures, and in particular detection of structures in Doppler echocardiograms, may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, the steps of the methods of FIGS. 6A and 6B may be defined by the computer program instructions stored in the memory 810 and/or storage 812 and controlled by the processor 804 executing the computer program instructions. Furthermore, the hierarchy of detectors trained by the above described methods and the detection results achieved by the above described methods can be stored in the memory 810 and/or storage 812. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a deformable structure in an image, a configuration of the deformable structure parameterized by a multi-dimensional parameter, comprising:
receiving an input image;
sequentially detecting a plurality of primitives in said input image, each primitive a partial parameterization of said multi-dimensional parameter, using a hierarchical set of primitive detectors, each of said primitive detectors detecting a corresponding one of said primitives, wherein a final one of said hierarchical set of primitive detectors detects configuration candidates for said multi-dimensional parameter; and
determining a configuration of the deformable structure in the input image based on the configuration candidates detected by said final one of said hierarchical set of primitive detectors.

2. The method of claim 1, wherein said input image is a Doppler echocardiogram and said deformable structure represents a measurement of blood flow in said Doppler echocardiogram.

3. The method of claim 1, wherein said step of sequentially detecting a plurality of primitives in said input image comprises, for each of said hierarchical set of primitive detectors:
classifying configuration candidates for said multi-dimensional parameter as positive or negative based on the corresponding primitive;
discarding configuration candidates classified as negative; and
passing the configuration candidates classified as positive to a next one of said hierarchical set of primitive detectors.

4. The method of claim 1, wherein each of said set of hierarchical primitive detectors is trained as a probabilistic boosting tree (PBT) based on training samples.

5. The method of claim 1, wherein said step of sequentially detecting a plurality of primitives in said input image comprises:
pruning the primitives detected by each of said hierarchical set of primitive detectors by selecting isolated modes of the primitives detected.

6. The method of claim 1, wherein the hierarchy of said primitive detectors is organized from computationally simple to computationally complex.

7. The method of claim 1, wherein said step of sequentially detecting a plurality of primitives in said input image comprises:
- detecting at least one landmark in said input image using at least one landmark detector;
- detecting at least one segment based on said at least one landmark using at least one segment detector; and
- detecting a configuration for said multi-dimensional parameter based on said at least one segment using a global template detector.

8. The method of claim 7, wherein said global template detector is a warping detector for detecting a warped image corresponding to said multi-dimensional parameter.

9. The method of claim 1, wherein said step of determining a configuration of the deformable structure in the input image based on the configuration candidates detected by said final one of said hierarchical set of primitive detectors comprises:
- selecting one of the configuration candidates detected by said final one of said hierarchical set of primitive detectors having a highest posterior probability.

10. The method of claim 9, wherein the posterior probability is a product of posterior probabilities from each of the hierarchical set of primitive detectors.

11. A method for training deformable structure detectors for detecting deformable structures in images, comprising:
- parameterizing a target deformable structure using a multi-dimensional parameter;
- determining a set of primitives for the target deformable structure, wherein said primitives are partial parameterizations of said multi-dimensional parameter and a final one of said primitives is said multi-dimensional parameter; and
- training a hierarchical set of primitive detectors based on training samples, each of said primitive detectors detecting a corresponding one of said set of primitives, wherein a final one of said primitive detectors detects configuration candidates for said multi-dimensional parameter.

12. The method of claim 11, wherein said step of training a hierarchical set of primitive detectors comprises:
- training each of said hierarchical set of primitive detectors as a probabilistic boosting tree (PBT).

13. The method of claim 11, wherein the hierarchy of said primitive detectors is organized from computationally simple to computationally complex.

14. The method of claim 11, wherein a configuration candidate not detected as a primitive by one of said hierarchical set of primitive detectors is discarded and not processed by any subsequent primitive detectors in said hierarchical set of primitive detectors.

15. The method of claim 11, wherein the training samples include negative and positive training samples, and the negative training samples for training one of each primitive detector are positive training samples for all previous primitive detectors in said hierarchical set of primitive detectors.

16. The method of claim 11, wherein said step of training a hierarchical set of primitive detectors comprises:
- training at least one landmark detector for detecting at least one landmark in an image;
- training at least one segment detector for detecting at least one segment based on said at least one landmark; and
- training a global template detector for detecting said multi-dimensional parameter based on said at least one segment.

17. The method of claim 11, further comprising:
- detecting said target deformable structure in an input image by sequentially detecting said primitives in the input image using said hierarchical set of primitive detectors.

18. An apparatus for detecting a deformable structure in an image, a configuration of the deformable structure parameterized by a multi-dimensional parameter, comprising:
- means for receiving an input image;
- means for sequentially detecting a plurality of primitives in said input image, each primitive a partial parameterization of said multi-dimensional parameter, using a hierarchical set of primitive detectors, each of said primitive detectors detecting a corresponding one of said primitives, wherein a final one of said hierarchical set of primitive detectors detects configuration candidates for said multi-dimensional parameter; and
- means for determining a configuration of the deformable structure in the input image based on the configuration candidates detected by said final one of said hierarchical set of primitive detectors.

19. The apparatus of claim 18, wherein said means for sequentially detecting a plurality of primitives in said input image comprises:
- means for classifying configuration candidates for said multi-dimensional parameter as positive or negative by each of said hierarchical set of primitive detectors based on the corresponding primitive;
- means for discarding configuration candidates classified as negative; and
- means for passing the configuration candidates classified as positive to a next one of said hierarchical set of primitive detectors.

20. The apparatus of claim 18, wherein each of said set of hierarchical primitive detectors is trained as a probabilistic boosting tree (PBT) based on training samples.

21. The apparatus of claim 18, wherein said means for sequentially detecting a plurality of primitives in said input image comprises:
- means for pruning the primitives detected by each of said hierarchical set of primitive detectors by selecting isolated modes of the primitives detected.

22. The apparatus of claim 18, wherein said means for determining a configuration of the deformable structure in the input image based on the configuration candidates detected by said final one of said hierarchical set of primitive detectors comprises:
- means for selecting one of the configuration candidates detected by said final one of said hierarchical set of primitive detectors having a highest posterior probability.

23. An apparatus for training deformable structure detectors for detecting deformable structures in images, comprising:
- means for parameterizing a target deformable structure using a multi-dimensional parameter;
- means for determining a set of primitives for the target deformable structure, wherein said primitives are partial parameterizations of said multi-dimensional parameter and a final one of said primitives is said multi-dimensional parameter; and
- means for training a hierarchical set of primitive detectors based on training samples, each of said primitive detectors detecting a corresponding one of said set of primitives, wherein a final one of said primitive detectors detects configuration candidates for said multi-dimensional parameter.

24. The apparatus of claim 23, wherein said means for training a hierarchical set of primitive detectors comprises:
   means for training each of said hierarchical set of primitive detectors as a probabilistic boosting tree (PBT).

25. The apparatus of claim 23, wherein the training samples include negative and positive training samples, and the negative training samples for training one of each primitive detector are positive training samples for all previous primitive detectors in said hierarchical set of primitive detectors.

26. A non-transitory computer readable medium encoded with computer executable instructions for detecting a deformable structure in an image, a configuration of the deformable structure parameterized by a multi-dimensional parameter, the computer executable instructions defining steps comprising:
   receiving an input image;
   sequentially detecting a plurality of primitives in said input image, each primitive a partial parameterization of said multi-dimensional parameter, using a hierarchical set of primitive detectors, each of said primitive detectors detecting a corresponding one of said primitives, wherein a final one of said hierarchical set of primitive detectors detects configuration candidates for said multi-dimensional parameter; and
   determining a configuration of the deformable structure in the input image based on the configuration candidates detected by said final one of said hierarchical set of primitive detectors.

27. The non-transitory computer readable medium of claim 26, wherein the computer executable instructions defining the step of sequentially detecting a plurality of primitives in said input image comprise, for each of said hierarchical set of primitive detectors, computer executable instructions defining the steps of:
   classifying configuration candidates for said multi-dimensional parameter as positive or negative based on the corresponding primitive;
   discarding configuration candidates classified as negative; and
   passing the configuration candidates classified as positive to a next one of said hierarchical set of primitive detectors.

28. The non-transitory computer readable medium of claim 26, wherein each of said set of hierarchical primitive detectors is trained as a probabilistic boosting tree (PBT) based on training samples.

29. The non-transitory computer readable medium of claim 26, wherein the computer executable instructions defining the step of determining a configuration of the deformable structure in the input image based on the configuration candidates detected by said final one of said hierarchical set of primitive detectors comprise computer executable instructions defining the step of:
   selecting one of the configuration candidates detected by said final one of said hierarchical set of primitive detectors having a highest posterior probability.

30. A non-transitory computer readable medium encoded with computer executable instructions for training deformable structure detectors for detecting deformable structures in images, the computer executable instructions defining steps comprising:
   parameterizing a target deformable structure using a multi-dimensional parameter;
   determining a set of primitives for the target deformable structure, wherein said primitives are partial parameterizations of said multi-dimensional parameter and a final one of said primitives is said multi-dimensional parameter; and
   training a hierarchical set of primitive detectors based on training samples, each of said primitive detectors detecting a corresponding one of said set of primitives, wherein a final one of said primitive detectors detects configuration candidates for said multi-dimensional parameter.

31. The non-transitory computer readable medium of claim 30, wherein the computer executable instructions defining the step of training a hierarchical set of primitive detectors comprise computer executable instructions defining the step of:
   training each of said hierarchical set of primitive detectors as a probabilistic boosting tree (PBT).

32. The non-transitory computer readable medium of claim 30, wherein the training samples include negative and positive training samples, and the negative training samples for training one of each primitive detector are positive training samples for all previous primitive detectors in said hierarchical set of primitive detectors.

* * * * *